Nov. 25, 1924.

T. F. MOORE 1,517,089

COMBINED MILK CAN OPENING AND SEALING DEVICE

Filed Feb. 16, 1923

INVENTOR.
THOMAS F. MOORE.
BY A.B.Bowman
ATTORNEY

Patented Nov. 25, 1924.

1,517,089

UNITED STATES PATENT OFFICE.

THOMAS F. MOORE, OF EAST SAN DIEGO, CALIFORNIA.

COMBINED MILK-CAN OPENING AND SEALING DEVICE.

Application filed February 16, 1923. Serial No. 619,334.

*To all whom it may concern:*

Be it known that I, THOMAS F. MOORE, a citizen of the United States, residing at East San Diego, in the county of San Diego and State of California, have invented a certain new and useful Combined Milk-Can Opening and Sealing Device, of which the following is a specification.

My invention relates to milk can opening and sealing devices, and the objects of my invention are: First, to provide a device of this class by which holes may be easily punctured in the end of the conventional milk can a spaced distance from the edge and which will serve as a cover and seal over the openings when the milk can is not in use; second, to provide a device of this class which will seal a milk can after being opened or punctured in such a manner that no milk will be lost or seep therefrom when the can is turned over or handled roughly in transportation; third, to provide a device of this class which can be easily and quickly applied to the milk can after it has been opened and before being set away in the cupboard, thus minimizing the souring action of the milk and the accessibility of vermin thereto; fourth, to provide a novelly constructed device of this class, and fifth, to provide a device of this class which is very simple and economical of construction, durable, efficient and which will not readily deteriorate or get out of order.

Figure 1:
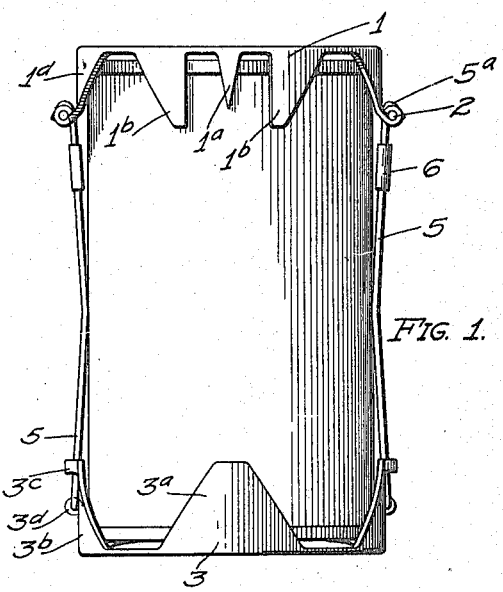
Figure 2:
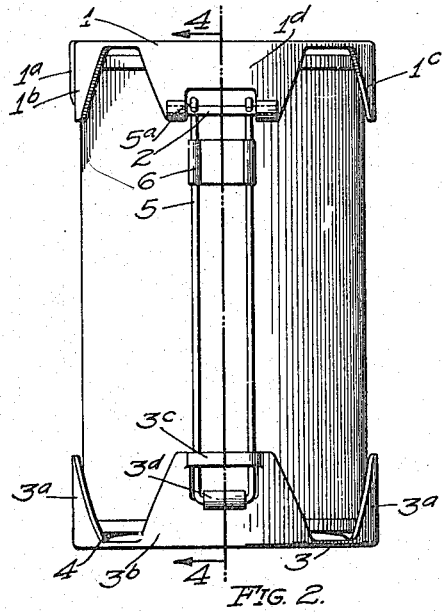
Figure 3:
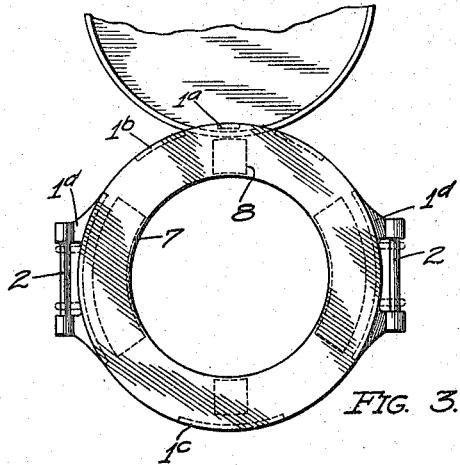
Figure 4:
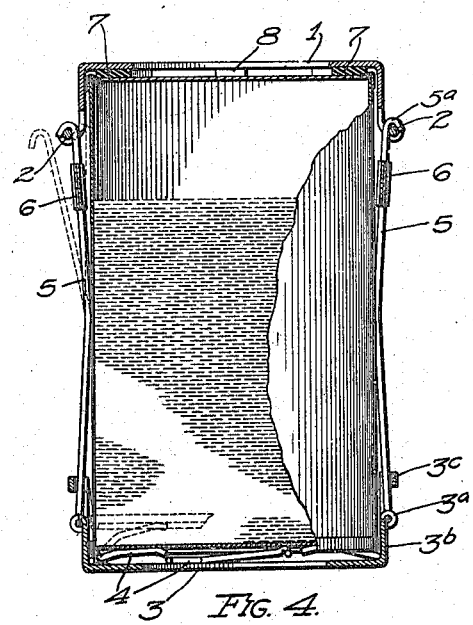
Figure 5:
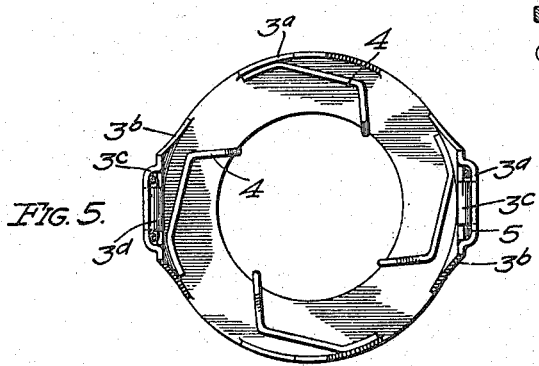

With these and other objects in view as will appear hereinafter, my invention consists of certain novel features of construction, combination and arrangement of parts and portions as will be hereinafter described in detail, and particularly set forth in the appended claims, reference being had to the accompanying drawings and to the characters of reference thereon which form a part of this application, in which:

Figure 1 is a side elevational view of my device, showing a milk can positioned therein; Fig. 2 is another side elevational view thereof taken at right angles to that of Fig. 1; Fig. 3 is a plan view of the cover portion of my device so positioned relatively to the milk can, shown fragmentarily, that a hole may be punctured therein; Fig. 4 is a sectional elevational view of my device taken through 4—4 of Fig. 2 with a milk can positioned therein, showing the same partly in section to facilitate the illustration, and showing by dotted lines the springs in the bottom member in a raised position before the milk can is clamped in the bottom member; and Fig. 5 is a plan view of the bottom portion of my device with the upwardly extending hook portions partly broken away and in section.

Like characters of reference refer to similar parts and portions throughout the several views of the drawings.

The cover member 1, bars 2, the bottom member 3, springs 4, spring hook members 5, tie members 6, sealing members 7, and the equalizing supports 8, constitute the principal parts and portions of my milk can opening and sealing device.

The cover member 1 consists of a plate, preferably in ring-like form, adapted to be positioned over the upper end of the milk can, and is provided with a plurality of downwardly extending lugs for positioning and supporting the same on the milk can. The lug $1^a$ is considerably smaller and sharper than the others and is adapted to puncture holes in one end of the milk can. Positioned on either side of the lug $1^a$ are lugs $1^b$, spaced a certain distance therefrom, adapted to position the lug $1^a$ over the end of the milk can preparatory to puncturing the holes therein, as shown in Fig. 3 of the drawings. On the opposite side of the cover from the lugs $1^a$ and $1^b$ is a lug $1^c$ adapted merely to retain the cover member in position on the can. Intermediate the lugs $1^b$ and $1^c$ and positioned opposite each other are lugs $1^d$, which are cut away at the middle portion and in the ends of which are secured the bars 2, preferably as shown, and which are spaced some distance from the milk can to permit the introduction of the hook portion $5^a$ of the hook members 5 between said bars and the milk can. The bottom member 3 also consists of a plate in ring-like form and it is provided with upwardly extending lugs $3^a$ and $3^b$ for positioning the milk can therein. The lugs $3^b$ are positioned opposite each other and intermediate the lugs $3^a$ and are provided at their upper ends with bars $3^c$, secured thereto, preferably integral therewith, which serve as supports for the resilient hook members 5 to prevent their dropping outwardly. The hook members 5, it will be noted, are made of wire and U-shaped, and are secured together near the upper ends by the tie members 6 for spacing and strengthening the hook members. These hook members are pivotally mounted in loops 3ᵈ on the lug portions 3ᵇ. At the upper end of said hook members are provided the hook portion 5ᵃ, previously described. It will be noted that the hook members 5 are bent inwardly at their middle portions engaging the milk can, tending to force the upper hook portions 5ᵃ outwardly and therefore at all times in engagement with the bars 2 secured in the cover member. In the plate portion of the bottom member 3 are provided a plurality of spring members 4, preferably made of wire and secured to the bottom plate and extending upwardly, inwardly and the end turned downwardly, as shown. Said spring members 4 are adapted to engage the bottom of the milk can, forcing the same upwardly against the cover portion and also tending to keep the hook portion 5ᵃ in locked engagement with the bars of the cover member. Intermediate the plate portion of the cover member and the milk can are provided a plurality of resilient members 7 and 8, preferably of rubber, which members 7 are long and adapted to be positioned over the punctured holes of the milk can to seal the same, and the other short members 8 intermediate those covering the holes are provided to uniformly support and position said cover member evenly on the milk can. The said members 7 and 8 are secured to the plate portion of the cover member 1 in any convenient manner, preferably by cementing the same thereto.

It will be noted that in order to puncture the holes in the milk can, as shown in Fig. 3 of the drawings, the lug portion 1ᵃ of the cover member is positioned over one end of the milk can, spaced from the edge thereof by the lug portions 1ᵇ of said cover member, which engage the outer edge of the milk can, and the cover member is then given a blow with the hand, or some other instrument, puncturing the milk can. It will also be noted that when desiring to seal the milk can the cover member is positioned over the punctured end of the milk can in such a manner that the sealing members 7 are positioned over the openings therein, and the milk can is then positioned in the bottom member 3, the hook members 5 being positioned upwardly and compressed against the can, as shown in Fig. 4 of the drawings, permitting the bars of the cover member to extend over the hook portions of the spring hook members 5, and by releasing the hook members 5, the inherent resiliency of the same forces the hook portions 5ᵃ over the bars 2, which are securely held in engagement therewith by the spring members 4 in the bottom member, forcing the milk can upwardly.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

It is obvious from this construction that there is provided a device for opening and sealing milk cans in which one portion of the device is used for puncturing the one end of the milk can and also serves as a cover and sealing means for the same; that there is provided a device of this class in which the milk can, after being opened, may be sealed in such a manner that milk will not be spilled or seep from the opening if the same is turned upside down or roughly handled in transportation; that there is provided a novelly constructed device of this class, and that there is provided a milk can opening and sealing device which is very simple and economical of construction, durable, efficient, and which will not readily deteriorate or get out of order.

Having thus described my invention, what I claim as new and desire to secure by Letters Patent, is:

1. A device of the class described, including a cover member provided with a puncturing lug at its edge extending downwardly, and other portions extending downwardly provided with hook engaging portions, a bottom member provided with upwardly extending lugs and hook members secured to said bottom member and adapted to engage the hook engaging portions on said cover member.

2. A device of the class described, including a cover member provided with a puncturing lug at its edge extending downwardly, and other portions extending downwardly provided with hook engaging portions, a bottom member provided with upwardly extending lugs, hook members secured to said bottom member and adapted to engage the hook engaging portions on said cover member, and resilient sealing means secured to the inner side of said cover member.

3. A device of the class described, including a cover member provided with a puncturing lug at its edge extending downwardly, and other portions extending downwardly provided with hook engaging portions, a bottom member provided with upwardly extending lugs, hook members secured to said bottom member and adapted to engage the hook engaging portions on said cover member, and resilient means in connection with said bottom member for retaining said hook members and hook engaging portions of said cover member in engagement with each other.

4. A device of the class described, including a cover member provided with downwardly extending retaining lugs, two of said lugs being oppositely positioned, and provided with hook engaging portions, a bottom member provided with upwardly extending lugs, two of said lugs being oppositely positioned, and provided with upwardly extending resilient hook members adapted to engage the hook engaging portions of said cover member.

5. A device of the class described, including a cover member provided with downwardly extending retaining lugs, two of said lugs being oppositely positioned, and provided with hook engaging portions, a bottom member provided with upwardly extending lugs, two of said lugs being oppositely positioned, and provided with upwardly extending resilient hook members adapted to engage the hook engaging portions of said cover member, resilient sealing means secured to the inner side of said cover member and spring means secured to said bottom member.

6. A device of the class described, including a cover member provided with a puncturing lug at its edge extending downwardly, positioning lugs spaced from said puncturing lug and extending downwardly and other oppositely positioned lugs provided with hook engaging portions, a bottom member provided with upwardly extending lugs and hook members pivotally mounted on oppositely positioned lugs on said bottom member, adapted to engage the hook engaging portions of said cover member.

7. A device of the class described, including a cover member provided with a puncturing lug at its edge extending downwardly, positioning lugs spaced from said puncturing lug and extending downwardly and other oppositely positioned lugs provided with hook engaging portions, a bottom member provided with upwardly extending lugs, hook members pivotally mounted on oppositely positioned lugs on said bottom member, adapted to engage the hook engaging portions of said cover member, and spring members secured to the inner, upper side of said bottom member.

In testimony whereof I have hereunto set my hand at San Diego, California, this 9 day of February, 1923.

THOMAS F. MOORE.